T. L. STURTEVANT.
FENCING STRAND.
APPLICATION FILED DEC. 5, 1914.

1,142,126.

Patented June 8, 1915.

Witnesses:
Harry King.
C. M. Sweeney

Inventor:
Thomas L. Sturtevant,
By Calvin Katon,
Attorneys.

THE NORRIS PETERS CO., PHOTO-LITHO., WASHINGTON, D. C.

UNITED STATES PATENT OFFICE.

THOMAS LEGGETT STURTEVANT, OF QUINCY, MASSACHUSETTS.

FENCING-STRAND.

1,142,126. Specification of Letters Patent. Patented June 8, 1915.

Application filed December 5, 1914. Serial No. 875,601.

*To all whom it may concern:*

Be it known that I, THOMAS L. STURTEVANT, a citizen of the United States, residing at Quincy, in the county of Norfolk and State of Massachusetts, have invented or discovered certain new and useful Improvements in Fencing-Strands, of which the following is a specification, reference being had therein to the accompanying drawing.
This invention has for its object to provide what are commonly known as "barbed" wire fences which will be of such construction that the spurs of the barbed wire, instead of serving the usual purpose of repelling, will be adapted to catch and hold objects which may come in contact therewith.

To this end the invention provides a fencing strand, which may consist of either a single wire or a plurality of wires twisted together, or may consist of a metal ribbon, with outwardly projecting spurs disposed at intervals along its length, and provided with sharp barbs pointing backwardly from the points of the spurs, like the barbs of fish hooks, so that these spurs will not only prick, but will seize and hold any objects which may come in contact therewith.

This improved fencing, and which is termed "war wire", is intended, as the name indicates, for war use, in that it will obviously be much more effective for military purposes than ordinary barbed wire, as defensive fences comprising this war wire, when assaulted by the enemy, will prove much more effective for defensive purposes, as they must be approached with caution, and will seize and hold assaulting soldiers coming in contact therewith in such a manner that they are liable to be killed or captured before being able to extricate themselves from the entanglements afforded by this "war wire".

Figure 1:
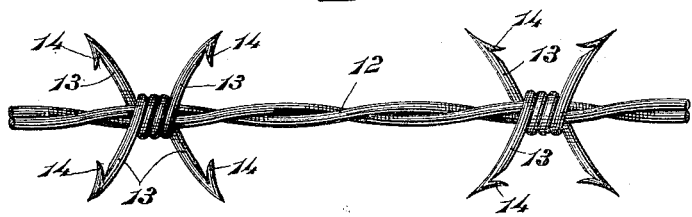
Figure 2:
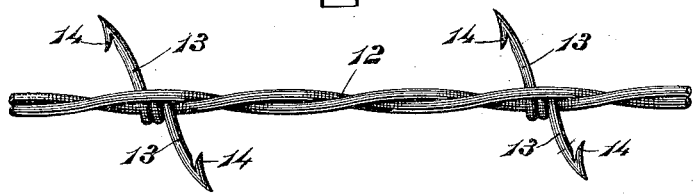
Figure 3:
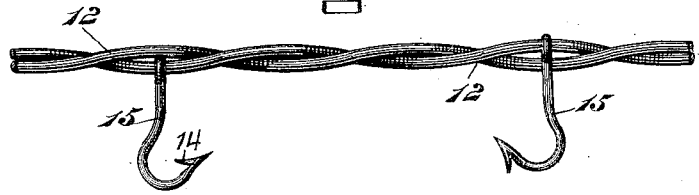
Figure 4:
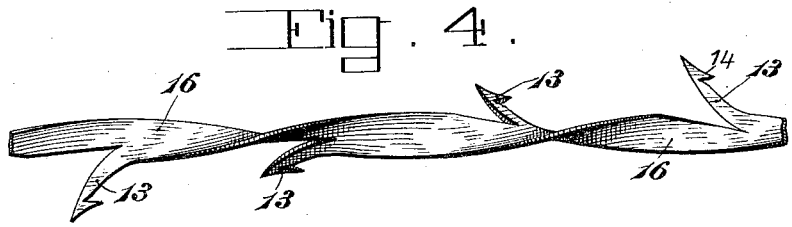

In the accompanying drawing Figures 1 and 2 illustrate preferred forms of the invention, and Figs. 3 and 4 show modified forms thereof.

Referring to Figs. 1 and 2 of the drawing, 12 denotes a fencing strand consisting of longitudinal intertwisted wires provided at intervals along its length with outwardly extending pointed spurs 13 provided near their points with sharp barbs 14 pointing backwardly from the points of the spurs. These spurs are preferably formed at the ends of twisted sections of wires encircling one or both of the wires of the fencing strands. The pointed spurs 13 are preferably somewhat curved, and the barbs 14 are preferably, but not necessarily, located on the insides of these curved spurs.

In the form of the invention shown in Fig. 3 the fencing strand 12, consisting of intertwisted wires, is provided at intervals along its length with barbed spurs 15 made like short fish hooks and having attaching loops which will preferably surround one of the wires so that if the wires be rather tightly twisted together they will hold these fish-hook spurs in place with more or less rigidity.

In the form of the invention shown in Fig. 4 the improved fencing strand consists of a metal ribbon 16, preferably of steel, and which is provided at intervals with barbed spurs 13 cut out from the edges of the ribbon.

From the foregoing it will be understood that the invention may be applied to any suitable or known form of "barbed" wire fencing by providing the spurs thereof with backwardly extending pointed barbs.

The barbed pointed members, which may be either in the form of spurs or hooks, should extend in different directions from the fence wires or strands, so as to serve their intended purpose when the fences embodying the invention are approached from any direction.

Having thus described my invention I claim and desire to secure by Letters Patent:

1. A metal fencing strand provided with pointed spurs having sharp barbs near their points, said barbs being inclined backwardly from the points of said spurs.

2. A metal fencing strand provided with pointed members disposed at intervals along its length, said pointed members having sharp, backwardly inclined barbs near their points.

3. A metal fencing strand consisting of two or more wires twisted together and provided at intervals along its length with pointed members having sharp, backwardly inclined barbs near their points.

In testimony whereof I affix my signature, in presence of two witnesses.

THOMAS LEGGETT STURTEVANT.

Witnesses:
 FLORA B. HECKER,
 EVA W. WHITE.